United States Patent
Mahany et al.

(10) Patent No.: US 7,298,791 B1
(45) Date of Patent: *Nov. 20, 2007

(54) MULTIPLE DATE RATE FILTERED MODULATION SYSTEM FOR DIGITAL DATA

(75) Inventors: Ronald L. Mahany, Cedar Rapids, IA (US); Thomas J. Schuster, Cedar Rapids, IA (US); Michael K. Ellis, Waseca, MN (US); Daniel E. Alt, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 720 days.

This patent is subject to a terminal disclaimer.

(21) Appl. No.: 10/397,057

(22) Filed: Mar. 25, 2003

Related U.S. Application Data (63) Continuation of application No. 09/234,948, filed on Jan. 21, 1999, now Pat. No. 6,539,064, which is a continuation-in-part of application No. 09/145,608, filed on Sep. 2, 1998, now abandoned.

(60) Provisional application No. 60/056,274, filed on Sep. 2, 1997.

(51) Int. Cl.
*H04L 25/49* (2006.01)

(52) U.S. Cl. ............... 375/295; 375/296; 332/108; 708/322; 455/102

(58) Field of Classification Search ............... 375/295, 375/296; 332/108; 708/322; 455/102
See application file for complete search history.

(56) References Cited

U.S. PATENT DOCUMENTS 5,867,535 A * 2/1999 Phillips et al. ............... 375/295
6,539,064 B1 * 3/2003 Ellis et al. ................... 375/296

* cited by examiner

*Primary Examiner*—Mohammed Ghayour
*Assistant Examiner*—Juan Alberto Torres (57) ABSTRACT

In an exemplary embodiment, a multi-rate data conversion circuit receives digital data at varying data rates, receives a data rate input corresponding to the digital data and converts the digital data to a converted output based upon the data rate input. A direct digital synthesis circuit receives the converted output and synthesizes a modulated output signal based upon the converted output. A multi-rate converter receives the digital data, the data rate input and a clock signal and converts the digital data to converted digital data. A multi-rate digital data filter receives the converted digital data and produces a filtered digital output. An output scaler receives the filtered digital output and produces a scaled and filtered digital output. Finally, an adder combines the scaled and filtered digital output with a center frequency input and produces the converted output.

20 Claims, 8 Drawing Sheets

MULTIPLE DATE RATE FILTERED MODULATION SYSTEM FOR DIGITAL DATA

CROSS-REFERENCE TO RELATED APPLICATIONS

The present application is a continuation of application Ser. No. 09/234,948 filed Jan. 21, 1999, now U.S. Pat. No. 6,539,064 issued Mar. 25, 2003, which is a continuation-in-part of application Ser. No. 09/145,608 filed Sep. 2, 1998, now abandoned, which in turn claims priority pursuant to 35 U.S.C. Sec. 119(e) to U.S. Provisional Application No. 60/056,274 filed Sep. 2, 1997. The aforementioned applications No. 09/145,608 and No. 60/056,274 are hereby incorporated herein by reference in their entirety.

BACKGROUND OF THE INVENTION

1. Technical Field

The present invention relates generally to the modulation of signals and more particularly to a system for modulating a digital input signal onto a carrier to produce an analog output wherein the system operates at multiple data rates, employs a direct digital synthesis (DDS) operation to produce the analog output signal and provides filtering to reduce system noise and discontinuities in the modulated signal.

2. Related Art

It is well known to modulate signals of interest upon a carrier signal to produce a modulated signal. Typical applications of such modulation include wired and wireless communication systems. A wireless communication system employs a radio frequency (RF) signal upon which signals of interest are carried. Such signals of interest may include voice signals and digitized data. In such systems the data and/or voice signals are modulated onto the RF carrier at a transmitting location and are wirelessly transmitted to a receiving location. At the receiving location, the modulated RF signal is typically down mixed to an intermediate frequency and then demodulated to reproduce the signal of interest.

Many varied methods of modulation are commonly employed in such systems. Such modulation techniques include frequency modulation (FM), amplitude modulation (AM), quadrature amplitude modulation (QAM), phase shift keying (PSK) and frequency shift keying (FSK), along with various other modulation techniques. A particular modification of FSK modulation includes incorporating Gaussian filtering to produce a filtered modulated signal. Gaussian filtering operates to reduce side lobes and other non-carrier frequency components of the modulated signal. Such modulation technique is typically referred to as Gaussian frequency shift keying (GFSK).

In most communication systems, however, the modulation of signals is not a simple task. Problems with modulation result from various factors, not all of which may be contemplated in the design of the modulation circuitry. In one particular application wherein GFSK modulation is used, modulation causes the carrier signal to have a varying frequency, such variation dependent upon the bit pattern modulated onto the carrier. This frequency variation is controlled by the level of a baseband signal. This signal consists of symbols, each of which occupies the same amount of time and represents one or more bits. In a typical GFSK application, a positive peak may be three volts while a negative peak may be negative three volts. In two GFSK operation, wherein a single data bit is modulated onto each symbol period of the carrier signal, a logic zero is represented by a negative three volt peak while a logic one is represented by a positive three volt peak. In four GSFK modulation, wherein two data bits are modulated onto each symbol period of the carrier signal, additional levels are required to represent bit patterns (0,0), (0,1), (1,0) and (1,1). Likewise, in eight GSFK modulation, still further levels are required to represent the still greater number of bit patterns. Thus, the relative frequency of a particular symbol period of the carrier frequency which represents the bit pattern for the particular symbol must be accurately generated.

Thus there exists a need in the art for an improved modulation system supporting multiple data rates while providing smooth transitions between data rates in a modulated output signal.

SUMMARY OF THE INVENTION

A multi-rate data modulation circuit constructed according to the present invention includes a multi-rate data conversion circuit and a modulator such as a direct digital synthesis circuit. The multi-rate data conversion circuit receives digital data at varying data rates, receives a data rate input corresponding to the digital data and converts the digital data to a converted output based upon the data rate input. The direct digital synthesis circuit receives the converted output and synthesizes a modulated output signal based upon the converted output.

In one embodiment of the multi-rate data modulation circuit, the multi-rate data conversion circuit includes a multi-rate converter, a multi-rate digital data filter, an output scaler and an adder. The multi-rate converter receives the digital data, the data rate input and a clock signal and converts the digital data to converted digital data. The multi-rate digital data filter receives the converted digital data and produces a filtered digital output. The output scaler receives the filtered digital output and produces a scaled and filtered digital output. Finally, the adder combines the scaled and filtered digital output with a center frequency input and produces the converted output.

In another embodiment of the multi-rate data modulation circuit, the multi-rate digital data filter includes a look-up table that produces filter parameters based upon the converted digital data and that operates at multiple data rates. The multi-rate data modulation circuit may be constructed such that the multi-rate digital data filter includes a digital data filter look-up table, a data rate decode circuit and a plurality of multiplexors. In such case, the data rate decode circuit receives the data rate input and produces control signals therefrom. Each of the plurality of multiplexors receives a portion of the converted digital data and control signals from the data rate decode circuit such that the multiplexors selectively provide the converted digital data to the digital data filter look-up table to produce the filtered digital output.

In accordance with one embodiment of the present invention, the direct digital synthesis circuit may include a phase accumulator, quadrant logic, a direct digital synthesis memory, an unsigned converter and a digital to analog converter. In the construction, the phase accumulator receives the converted output. The quadrant logic couples to the phase accumulator and receives an output of the phase accumulator while the direct digital synthesis memory couples to the quadrant logic and receives an output of the quadrant logic. The unsigned converter couples to the direct digital synthesis memory, receives an output of the direct digital synthesis memory and produces an unsigned output. Finally, the digital to analog converter couples to the unsigned converter, receives the unsigned output and produces the modulated output signal.

In the multi-rate data modulation circuit, the multi-rate data modulation circuit may operate to couple a single bit of data to each symbol period of the modulated output signal during a first time period, to couple two bits of data to each symbol of the modulated output signal during a second time period and to couple three bits of data to each symbol of the modulated output signal during a third time period. The multi-rate data modulation circuit is capable of switching between other sequences of data rates.

The multi-rate data modulation circuit according to the present invention may be installed within a wireless network device, for example. In such case, the wireless network device would include data processing circuitry, the multi-rate data conversion circuit, the direct digital synthesis circuit and a radio. In the wireless network device, the data processing circuitry produces digital data at varying data rates. The multi-rate data conversion circuit receives the digital data at the varying data rates from the data processing circuitry, receives a data rate input corresponding to the digital data and converts the digital data to a converted output based upon the data rate input. The direct digital synthesis circuit then receives the converted output and synthesizes a modulated output signal based upon the converted output. Finally, the radio receives the modulated output signal and transmits the modulated output signal.

In such installation, the wireless network device may also include demodulation circuitry and data conversion circuitry. The demodulation circuitry demodulates the modulated receive signal to produce a demodulated input signal. Further, the data conversion circuitry receives the demodulated input signal, produces converted digital data and transmits the converted digital data to the data processing circuitry.

Moreover, other aspects of the present invention will become apparent with further reference to the drawings and specification which follow.

DETAILED DESCRIPTION

Figure 1:
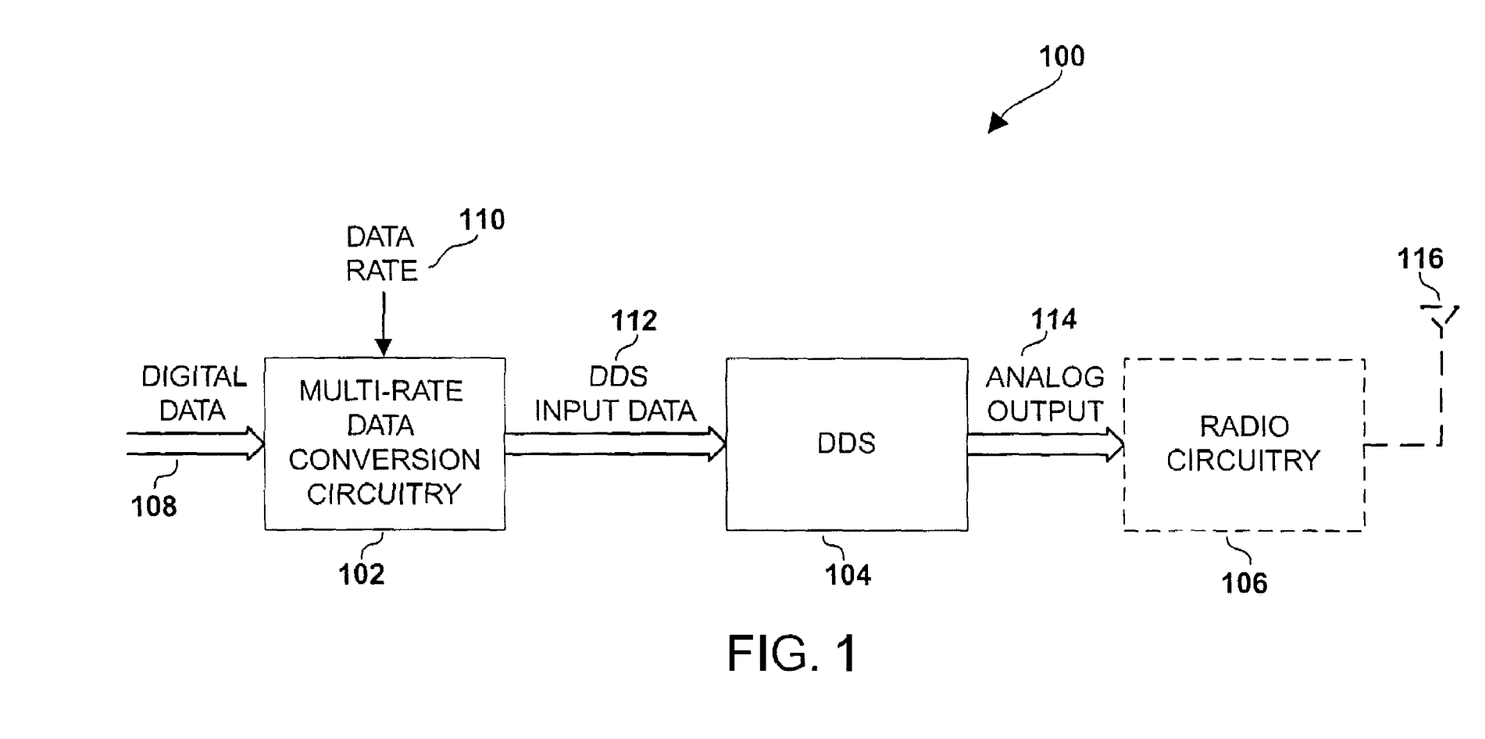
FIG. 1 is a block diagram illustrating a multiple data rate modulation circuit constructed according to the present invention that produces a filtered analog output at a carrier frequency based upon a digital data input and a data rate.

FIG. 1 is a block diagram illustrating a multiple data rate modulation circuit 100 (hereinafter, "modulation circuit") constructed according to the present invention. The modulation circuit 100 receives digital data 108 and produces a modulated analog output 114 based upon the digital data 108 and the data rate 110. The digital data 108 may include various types of digital information such as data files, multimedia information, digitized voice signals, video information, and any other type of information that may be placed into a digital format. The modulated analog output 114 may be received as input to radio circuitry 106 that RF couples the modulated analog output 114 and transmits such RF coupled signal in a wireless fashion via an antenna 116. However, the analog output 114 could be coupled to various other transmission mediums as well. Such transmission mediums may include wired communication links, fiber optic links, microwave links, and various other transmission links that may be used to transmit information from a transmitting location to a receiving location.

In the disclosed embodiment of the invention, the modulation circuit 100 includes multi-rate data conversion circuitry 102 and a direct digital synthesis (DDS) circuit 104. The DDS circuit 104 may also be known as a direct digital frequency synthesis circuit as well. The construction of such a DDS circuit 104 is generally known in the art and will not be further described here except as to expand upon the principle of the present invention. It is contemplated that the modulation circuit 100 may incorporate a modulator other than the DDS circuit 104.

The multi-rate data conversion circuitry 102 receives the digital data 108 and a data rate signal 110 and produces DDS input data 112. The multi-rate data conversion circuitry 102 operates at various data rates 110 and with varying amounts of digital data 108. The multi-rate data conversion circuitry produces the DDS input data 112 in a format corresponding to a format supported by the DDS circuitry 104.

In a contemplated installation supporting IEEE 802.11 standards, the multi-rate data conversion circuitry 102 is capable of altering the rate at which the digital data 108 is coupled at any given time. For example, digital data 108 may be coupled at a rate of one bit per symbol, such rate corresponding to one mega bits per second (1 MBPS). However, digital data 108 may also be coupled such that two bits of digital data are coupled to each symbol, such rate corresponding to 2 MBPS. Furthermore, the teachings of the present invention may also be employed to couple three bits, four bits, or more bits of data to each symbol to produce correspondingly higher data rates. Based upon the state of the data rate input 110, the multi-rate data conversion circuitry 102 alters its operation in producing the DDS input data 112. The multi-rate data conversion circuitry 102 is capable of transitioning smoothly between data rates at any time, as controlled by the data rate input 110.

Figure 2:
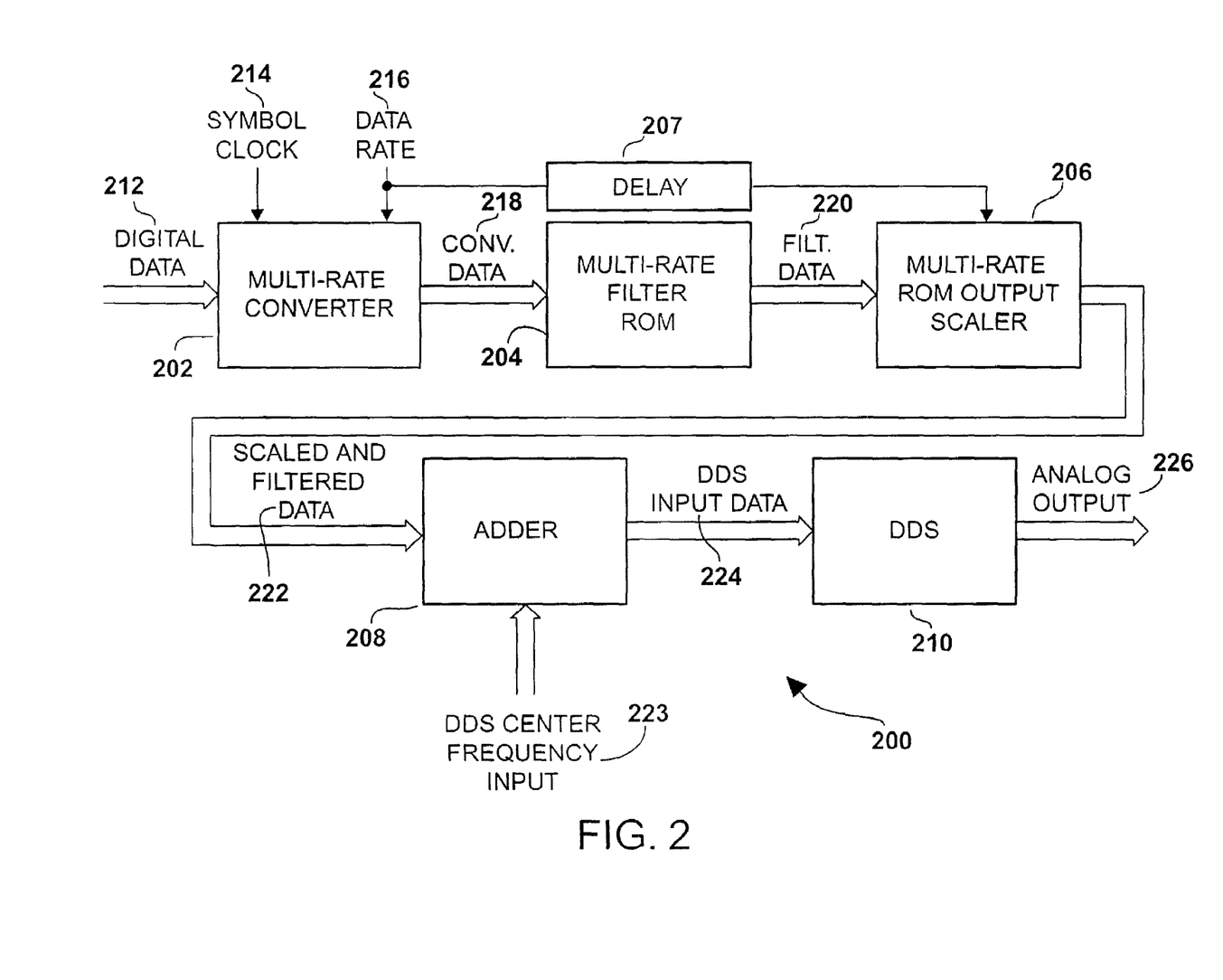
FIG. 2 is a block diagram illustrating in more detail the modulation circuit illustrated in FIG. 1.

FIG. 2 is a block diagram illustrating a particular embodiment of a multiple data rate modulation circuit 200 constructed according to the present invention and previously generally described with reference to FIG. 1. The modulation circuit 200 includes a multi-rate converter 202, a multi-rate filter ROM 204, a multi-rate ROM output scaler 206, a delay circuit 207, an adder 208 and DDS circuitry 210. The multi-rate converter 202 receives digital data 212, a symbol clock 214 and a data rate indicator 216. In the embodiment illustrated, the symbol clock 214 serves to validate the digital data 212 appearing at the multi-rate converter 202, clocking the digital data 212 into the multi-rate converter 202. Based upon the state of the data rate indicator 216, the multi-rate converter 202 converts the digital data 212 present at its input to converted data 218. As will be further described herein, one such method of converting the digital data 212 to the converted data 218 includes converting single bit data received as the digital data 212 to multiple bit converted data 218.

The multi-rate filter ROM 204 receives the converted data 218 and produces filtered data 220 at its output. One fashion in which the multi-rate filter ROM 204 operates is to receive multiple samples of the converted data 218 and, based upon the value of the multiple samples, select filtering functions to produce the filtered data 220. One particular operating situation that may be encountered involves the transition of the converted data 218 from a first data rate to a second data rate. Such transitions often involve a step change in the value of the converted data 218. For example, in two GFSK modulation, a logic zero is represented as a −1 volt amplitude and a positive peak is represented as a +1 amplitude, assuming a positive peak of the baseband signal of +1 volts and a negative peak of the modulated signal of −1 volts. However, in four GFSK operation, the digital data (0,0) is represented as a −1.35 volt amplitude, the digital data (0,1) as a −0.45 volt amplitude, the digital data (1,1) as a +0.45 volt amplitude and the digital data (1,0) as a +1.35 volt amplitude. The difference in voltage levels between two GFSK and four GFSK is that the modulated signal 226 occupies the same bandwidth regardless of the data rate. Thus, at any point in operation when the data rate changes, an abrupt transition from one of the values to another of the values typically occurs. Thus, the multi-rate filter ROM 204 compensates for such abrupt transitions and produces filtered data 220 that smooths such abrupt transitions.

According to the present invention, a multi-rate ROM output scaler 206 allows a single GFSK ROM look up table to be used to produce the filtered data 220. As will be further described herein, differing data rates require that the DDS input data 224 have specific output levels that represent the digital data 212. The filtered data 220 is scaled according to the data rate indicator 216. In the disclosed embodiment of the invention, the multi-rate ROM output scaler 206 utilizes a delayed version of the data rate indicator 216 provided by the delay circuit 207. The delay approximates the propagation delay of data through the multi-rate filter ROM 204.

As compared to systems which may use multiple filter ROMs, each of which operates with a respective data rate, the modulation circuitry 200 of the present invention uses a single multi-rate filter ROM 204 and a multi-rate ROM output scaler 206 to operate in any of the various data rates. This allows the modulation circuitry 200 to dynamically switch data rates, which multiple-ROM systems cannot do without considerable added complexity.

Adder 208 receives the scaled and filtered data 222 and a DDS center frequency input 223. The DDS center frequency input 223 represents the DDS center frequency and may be derived from a value stored in a register (not shown). The adder 208 may also receive additional signals which determine whether the scaled and filtered data 222 and the DDS center frequency 223 are added or are subtracted by the adder 208. Such add and subtract signal is based upon the value of the data to be modulated. The output of the adder 208 serves as the DDS input data 224. The DDS circuitry 210 receives the DDS input data 224 and produces the analog output 226. The analog output 226 may then be coupled to a radio, a transmission system or other such system upon which the analog output 226 is transmitted.

Figure 3:
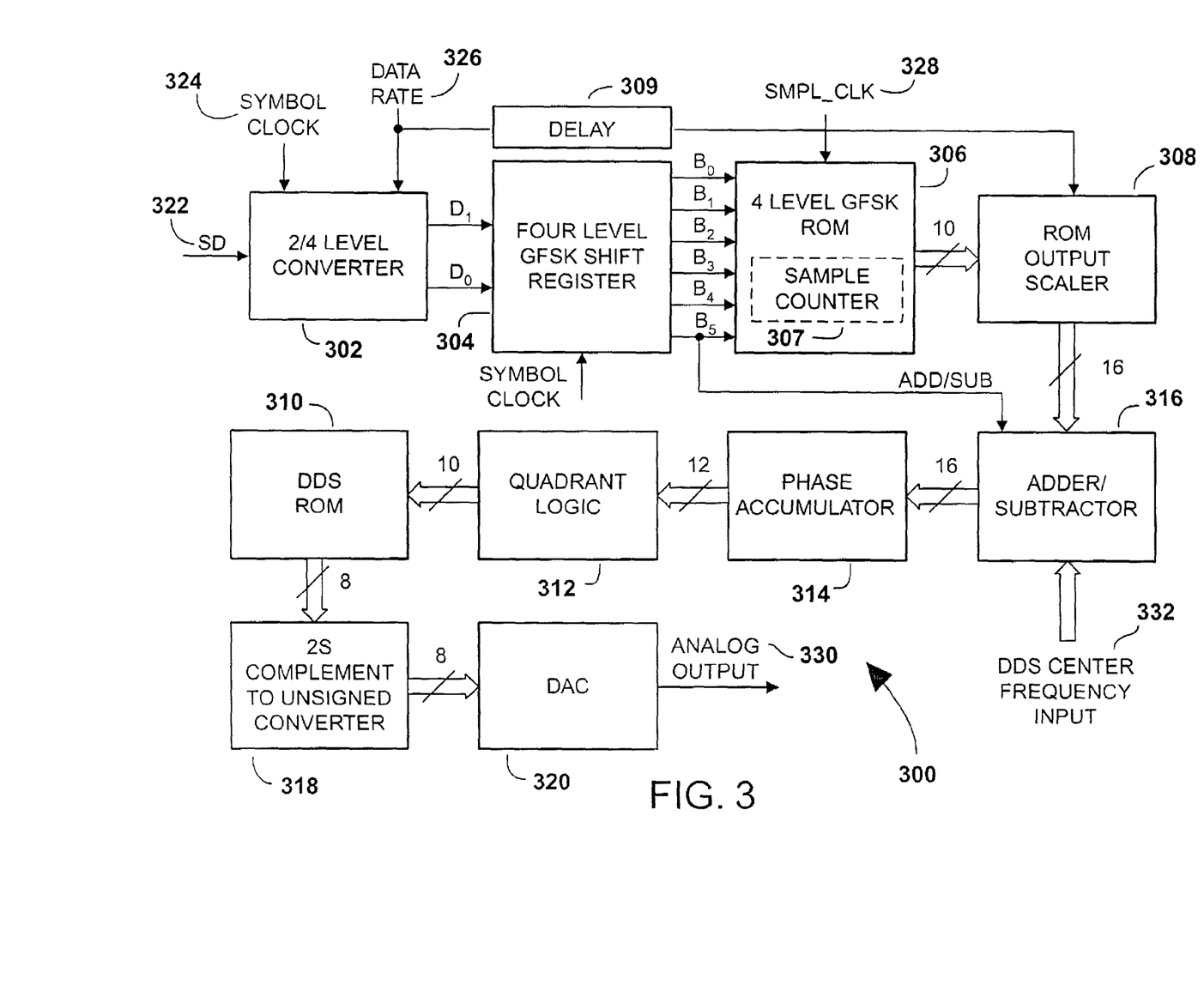
FIG. 3 is a block diagram illustrating an alternative embodiment of a modulation circuit constructed according to the present invention that receives serial digital data and produces a modulated analog output, the modulation circuit operating at varying data rates and clocking frequencies.

FIG. 3 illustrates a modulation circuit 300 constructed according to the present invention that is specifically designed to operate according to both two level and four level GFSK modulation. Operating in this fashion, the modulation circuitry 300 couples either one or two bits to each symbol. The modulation circuit 300 includes a 2/4 level converter 302, a 4 level GFSK shift register 304, a 4 level GFSK ROM 306, a ROM output scaler 308, an adder/subtractor 316 and DDS circuitry. The DDS circuitry includes a phase accumulator 314, quadrant logic 312, a DDS ROM 310, a 2's complement to unsigned converter 318, and a digital to analog converter (DAC) 320. The components of the modulation circuit 300 receive serial data 322 as an input and produce a modulated analog output 330.

The 2/4 level converter 302 receives the serial data $S_D$ 322, a symbol clock 324 and a data rate indicator 326. The serial data $S_D$ 322 is clocked in at the rate of the symbol clock 324 multiplied by the data rate as indicated by the data rate indicator 326. The output of the 2/4 level converter is parallel digital data having data bits $D_1$ and $D_0$. Based upon the data rate indicator 326, the 2/4 level converter produces either two or four of the possible combination of data bits $D_1$ and $D_0$. The output of the 2/4 level converter 302 is produced at a particular clocking frequency known as the symbol rate. In the embodiment contemplated, operating according to IEEE 802.11 standards, the clocking frequency is at one megabits per second (MBPS).

The four level GFSK shift register 304 receives the input data $D_1$ and $D_0$ and produces output data $B_5$ through $B_0$. As will be further described herein, outputs $B_5$ through $B_0$ represent three particular samples of the input data $D_1$ and $D_0$. Such output data $B_5$ through $B_0$ is then received by the 4 level GFSK ROM 306. Based upon signals $B_5$ through $B_0$, and the contents of a sample counter 307 within the 4 level GFSK ROM, the 4 level GFSK ROM 306 produces a filtered output having a ten bit width. The 4 level GFSK ROM 306 also receives clocking signal SMPL_CLK 328.

The ROM output scaler 308 receives the filtered output from the 4 level GFSK ROM 306 and also a delayed version of the data rate indicator 326 provided by the delay circuit 309. The delay circuit 309 approximates the delay through the 4 level GFSK shift register 304 and the 4 level GFSK ROM 306. The ROM output scaler 308 produces a 16 bit scaled output. This scaled output is provided to the adder/subtractor 316 which also receives the DDS center frequency input 332. The adder/subtractor 316 also receives the most significant bit $B_5$ (add/sub) produced by the 4 level GFSK shift register 304. Based upon the add/sub signal received from the 4 level GFSK shift register 304, the adder/subtractor either adds the output from the ROM output scaler 308 to the DDS center frequency input 332 or subtracts the output from the ROM output scaler 308 from the DDS center frequency input 332.

In either case, the adder/subtractor produces a 16 bit output which is provided to the phase accumulator 314. The phase accumulator 314 operates in a fashion to produce a phase accumulated output having 12 bits which is received by the quadrant logic 312. The quadrant logic, based upon a portion of the 12 bit input, determines a 10 bit output signal that is provided to the DDS ROM 310. The DDS ROM 310 performs a look up function based upon the 10 bit input and produces an 8 bit output. This 8 bit output is received by the 2's complement to unsigned converter 318 which produces an unsigned output having 8 bits which is provided to digital analog converter (DAC) 320. The DAC 320 receives the 8 bit input signal and produces an analog output 330 based upon the 8 bit input signal.

Figure 4:
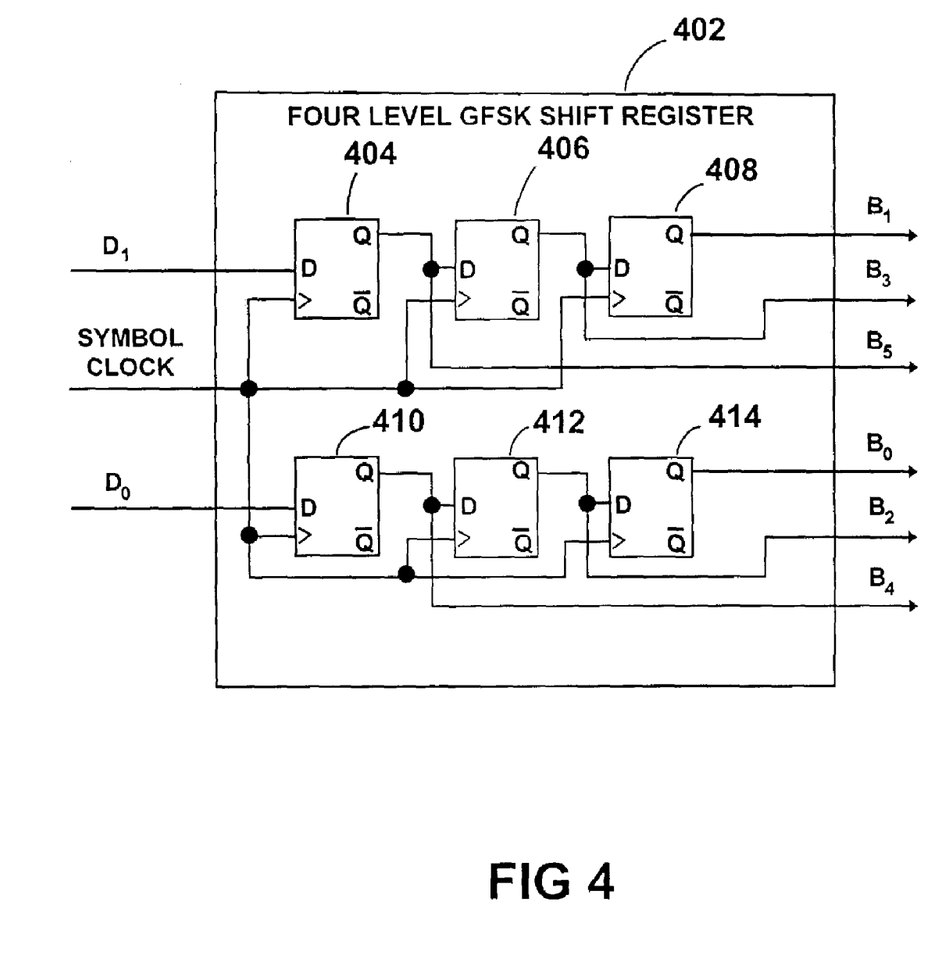
FIG. 4 is a schematic block diagram illustrating a four level GFSK shift register that produces outputs that are provided to a four level GFSK filter ROM, such element previously illustrated with respect to FIG. 3.

FIG. 4 illustrates a particular embodiment of the 4 level GFSK shift register 304 previously illustrated more generally with respect to FIG. 3. The 4 level GFSK shift register 402 receives data bits $D_1$ and $D_2$ as well as a symbol clock. The 4 level GFSK shift register 402 includes D flip flops 404, 406, 408, 410, 412 and 414. D flip flop 404 receives data bit $D_1$. D flip flop 406 receives as its input the output of D flip flop 404 while D flip flop 408 receives as its input the output of D flip flop 406. Thus, D flip flops 404, 406 and 408 together serve as a shift register for bit $D_1$ with such shift register being clocked by the symbol clock.

D flip flops 410, 412 and 414 serve as a shift register for bit $D_0$, such shift register also are being clocked by the symbol clock. As is indicated, the six bits of output $B_5$ through $B_0$ produced by the 4 level GFSK shift register 402 represent the particular six states represented in the six D flip flops. With the current clock input values of $D_1$ and $D_0$ as a reference, bits $B_5$ and $B_4$ represent the most significant digits in the output. Bits $B_3$ and $B_2$ represent the next lesser significant digits in the output while bits $B_1$ and $B_0$ represent the least significant digits in the output.

Bits $B_5$ through $B_0$ are received by the 4 level GFSK ROM 306 and the adder/subtractor 316 previously illustrated with respect to FIG. 3. Thus, the 4 level GFSK shift register 402 provides an input to the GFSK ROM 306 so that the 4 level GFSK ROM 306 may perform filtering on data that transitions through the 4 level GFSK shift register 402.

The memory provided by the 4 level GFSK shift register 402/304 allows the GFSK ROM 306 to provide smooth transitions between data levels. The shift register 402 effectively provides a delay from $D_1$ and $D_0$ to $B_3$ and $B_2$, respectively, plus additional delay elements for the values of $D_1$ and $D_0$ in the symbol periods immediately before and after. Thus, $B_3$ and $B_2$ reflect a delayed version of the current symbol, $B_1$ and $B_0$ reflect the previous symbol, and $B_5$ and $B_4$ reflect the next symbols. With this information, the GFSK ROM 306 of the disclosed embodiment can produce a smooth transition from midway between the previous and current symbol levels to the current symbol level, and from the current symbol level to midway between the current and next symbols. For the following symbol period, the current symbol ($B_3$, $B_2$) becomes the previous symbol ($B_1'$, $B_0'$), the next symbol ($B_5$, $B_4$) becomes the current symbol ($B_3'$, $B_2'$). A new symbol becomes the next symbol ($B_5'$, $B_4'$). In this new period, the output of the GFSK ROM 306 again starts midway between the previous ($B_1'$, $B_0'$) and current ($B_3'$, $B_2'$) symbol levels. These are the same as the current ($B_3$, $B_2=B_1'$, $B_0'$) and next ($B_5$, $B_4=B_3'$, $B_2'$) symbol levels from the first symbol period, meaning the output signal is continuous.

Figure 5:
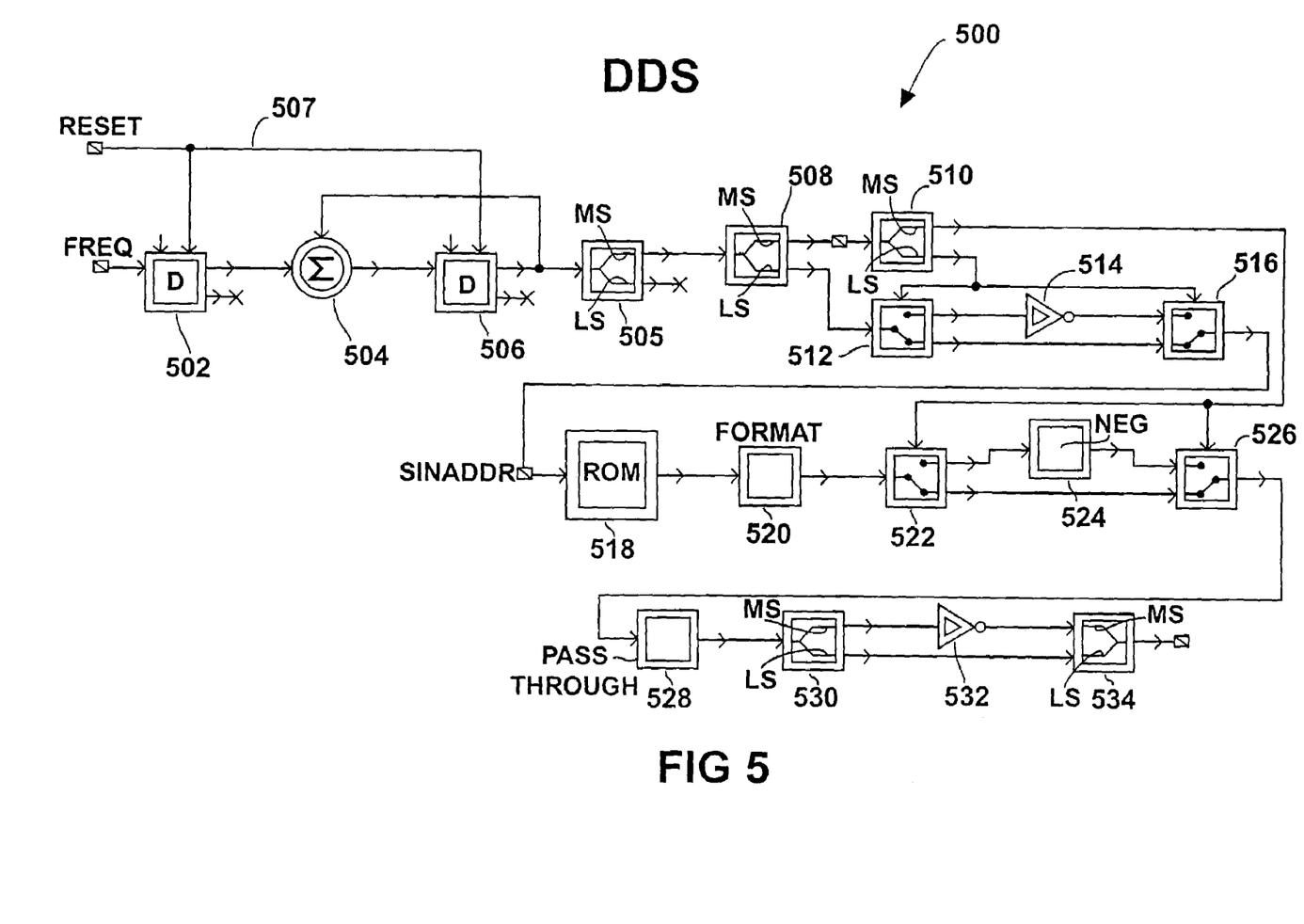
FIG. 5 is a schematic diagram illustrating various components of a direct digital synthesis circuit constructed according to the present invention.

FIG. 5 illustrates particular circuitry 500 associated with the DDS circuitry 210 illustrated in FIG. 2 as well as particular components illustrated with respect to FIG. 3. As is shown, the DDS circuitry 500 includes a D flip flop 502 that has a 16 bit width that receives the output from the adder/subtractor 316. The phase accumulator includes an adder 504 and an output D flip flop 506. The adder 504 receives the output of the D flip flop 502 and the contents of the prior output of the adder held in the output D flip flop 506. Reset signal 507 is asserted to clear the contents of both the input D flip flop 502 and D flip flop 506 for initialization purposes.

Element 505 strips the least significant 4 bits from the output of D flip flop 506 and provides the 12 most significant bits of the output of D flip flop 506 to splitter 508. Splitter 508 provides the two most significant bits of its output to splitter 510 and the least significant 10 bits to switch 512. Based upon the least significant bit of the input to splitter 510, the input to switch 512 is either passed to switch 516 or inverted via 10 bit inverter 514. The output of switch 516 is a 10 bit value which serves as the address to the DDS ROM 518. The output of the DDS ROM 518 has 8 bits and is formatted via formatter 520 and then provided to switch 522. Based upon the most significant bit of the output of splitter 510, which determines the quadrant of the analog signal produced by the DDS, switch 522 is positioned to generate either a 2's complement inversion of the 8 bit signal received from the formatter by means of NEG 524, or simply to pass such signal to switch 526.

The output of switch 526 is passed through block 528 to splitter 530. Splitter 530 inverts the most significant bit of the 8 bit value at inverter 532, passes such inverted bit through combiner 534, and produces an 8 bit output respective to the 2s complement unsigned converter 318 of FIG. 3. Such 8 bit output is provided to a digital to analog converter (DAC) such as that illustrated at 320 in FIG. 3. Thus, the components of the DDS illustrated with respect to FIG. 5 function to convert the filtered output produced via the other components of the modulation circuitry and to provide an input to the digital analog converter.

Figure 6:
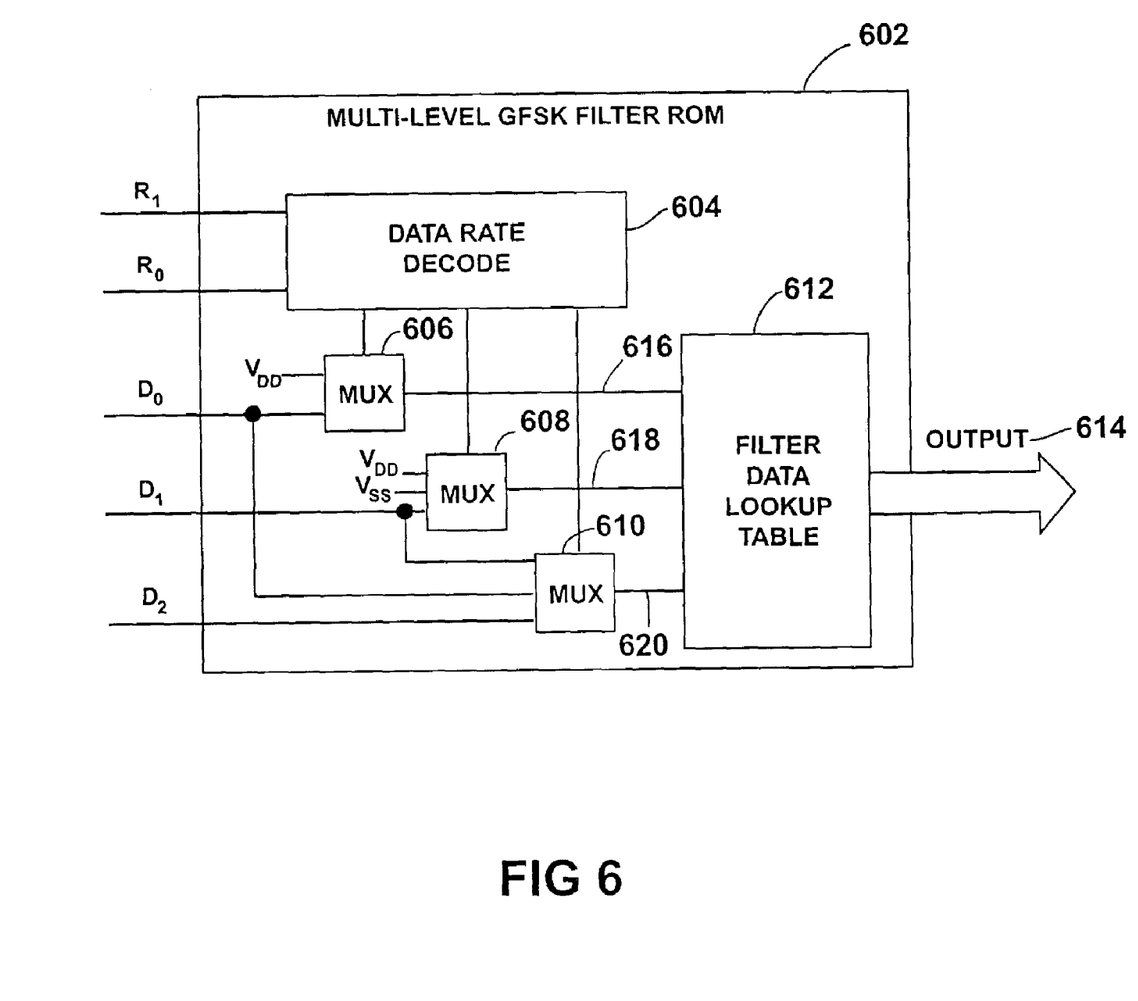
FIG. 6 is a schematic diagram of a multilevel GFSK filter ROM constructed according to the present invention.

FIG. 6 illustrates a particular embodiment of a multi-level GFSK filter ROM 602 according to the present invention. The concepts displayed with respect to the particular GFSK filter ROM 602 may be employed in a circuit supporting 2, 4, and 8 (or more) level operation. In such case, 1, 2 or 3 bits would serve as input data $D_2$, $D_1$ and $D_0$ to the multilevel GFSK filter ROM 602. In such case, two data rate indicator bits $R_1$ and $R_0$ are received by the multilevel GFSK filter ROM 602.

The data rate decode circuitry 604 receives signals $R_1$ and $R_0$ and operates multiplexors 606, 608 and 610. Depending upon the rate at which the multilevel filter ROM operates, a filtered data look up table 612 can be operated to accept 2, 4 and 8 GFSK operation. The filtered data look up table 612 receives 3 bits of input. Table 1 below illustrates deviations for 2 GFSK, Table 2 below illustrates deviations for 4 GFSK operation and Table 3 below illustrates deviations for 8 GFSK operation. In such tables, h2 and $f_3$ represent relative deviation levels based upon the particular implementation employed.

TABLE 1

| 2 GSFK OPERATION | |
| --- | --- |
| data | Deviation |
| 1 | $(h2/2) \cdot f_3$ |
| 0 | $-(h2/2) \cdot f_3$ |

TABLE 2

| 4 GFSK OPERATION | |
| --- | --- |
| data | Deviation |
| 10 | $3 \cdot (h4/2) \cdot f_3$ |
| 11 | $(h4/2) \cdot f_3$ |
| 01 | $-(h4/2) \cdot f_3$ |
| 00 | $-3 \cdot (h4/2) \cdot f_3$ | where h4 = 0.45 * h2

TABLE 3

8 GFSK OPERATION

| data | Deviation |
| --- | --- |
| 100 | 7 · (h8/2) · $f_3$ |
| 101 | 5 · (h8/2) · $f_3$ |
| 111 | 3 · (h8/2) · $f_3$ |
| 110 | (h8/2) · $f_3$ |
| 010 | −(h8/2) · $f_3$ |
| 011 | −3 · (h8/2) · $f_3$ |
| 001 | −5 · (h8/2) · $f_3$ |
| 000 | −7 · (h8/2) · $f_3$ | where h8 = 0.5 * h4 = 0.225 * h2

Equations (1) and (2) below relate two bit operation of the 8 GFSK filter data look up table 612 to 2 bit operation. In operating the 8 GFSK filter data lookup table 616 for 2 GFSK operation, signal bit of input $D_0$ is provided as the most significant bit 620 to the filter data look up table 612 while input bits 616 and 618 are held at logic high and low levels, respectively. Such operation is accomplished by multiplexing data bit $D_0$ from multiplexor 610 into the filter data lookup table 616 while holding the outputs of multiplexors 606 and 608 at logic high and low levels, respectively. Further, to complete such operation, the output of filtered data look up table 614 may be scaled by a factor of 1/1.125. Alternatively, the table output could be scaled by a factor of 1 for 2-level and 1.125 for 8-level, also adjusting the 4-level scaling factor accordingly. Such may be accomplished using the multi-rate ROM output scaler 206 located in FIG. 2.

$$*f_2(x) = [(h2/h8) \cdot f_8(x,1,0) = h2/(3 \cdot h8)] \cdot f_8(x,1,1) = [h2/(5 \cdot h8)] \cdot f_8(x,0,1) = [h2/(7 \cdot h8)] \cdot f_8(x,0,0)] \quad \text{Equation (1)}$$

$$f_2(x) = \frac{f_8(x,1,0)}{0.225} = \frac{f_8(x,1,1)}{0.675} = \frac{f_8(x,0,1)}{1.125} = \frac{f_8(x,0,0)}{1.575} \quad \text{Equation (2)}$$

Equations (3) and (4) illustrate how 4 GFSK operation may be achieved with the 8 GFSK filter data look up table 612 by setting line 618 logic high (the output of multiplexor 608), by providing data bit $D_1$ through multiplexor 610 as line 620 and by providing data bit $D_0$ as input 616 to the filter data look up table 616 via multiplexor 606. Thus, according to the present invention, multiple data rates may be accomplished in a single filter data look up table 616 in conjunction with a scaled output element 206 to provide multi-data rate operation, all supported by a single unit.

$$f_4(x,y) = (h4/h8) \cdot f_8(x,1,y) \quad \text{Equation (3)}$$

$$f_4(x,y) = 2 \cdot f_8(x,1,y) \quad \text{Equation (4)}$$

As can be seen, modulation outputs are mapped to appropriate locations in the filter data lookup table 616 by the data rate decode circuitry 604 and multiplexors 606, 608, and 610. In order to minimize the size of the discontinuity of the scaled and filtered data 222 (FIG. 2) when the data rate changes, the mapping may be chosen to keep the ratio of the output scaling factors near unity. In the 2/4-level case discussed above, for example, the 2-level inputs are mapped to the extreme 4-level output levels in order to produce the scaling factor ratio nearest unity (1.35 or 1/1.35=0.74 as opposed to 0.45 or 1/0.45=2.22). Similarly, for the 2/4/8-level case, the third expression for $f_2(x)$ in Equation (2) may be used because the relative scaling factor (1.125) is closest to unity.

In the disclosed embodiment, only one mapping from $f_8(\ )$ to $f_4(\ )$ is shown. However, the resulting scaling factor of 2 is relatively large (the scaled filter output will double or halve at transitions between 4-level and 8-level signaling), suggesting that this method could be enhanced by adding two additional levels to the 8 GFSK filter data lookup table 616 (at the cost of added complexity). Accordingly, it is contemplated that improved results may be obtained by mapping the "outer" 4-GFSK levels to the "outer" 8-GFSK levels and creating new table entries for the "inner" 4-GFSK levels. These new levels might be, for example, at ±7/3·(h8) ·$f_3$ with a resulting 4-GFSK output scaling factor of 6/7≈0.857. In addition, it should be noted that the scaling factor for the highest order modulation output need not be unity.

Figure 7:
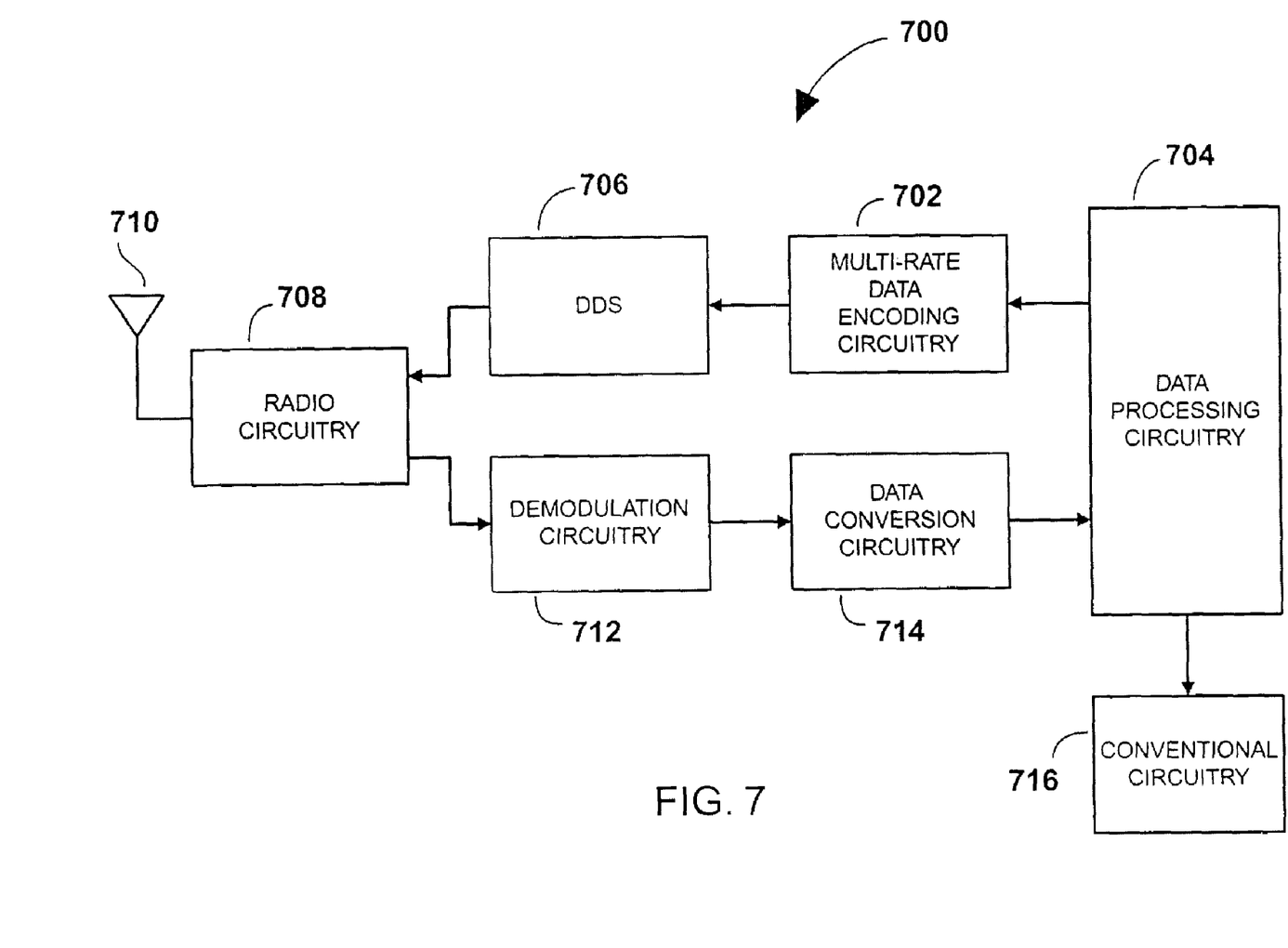
FIG. 7 is a block diagram illustrating a wireless network device having a multiple data rate modulation circuit constructed according to the present invention.

FIG. 7 illustrates an exemplary installation of a modulation circuit constructed according to the present invention. The particular installation contemplated is a wireless terminal 700 that includes multi-rate data encoding circuitry 702 and DDS circuitry 706 constructed in accordance with previously described circuits. The multi-rate data encoding circuitry 702 receives digital data from connected data processing circuitry 704, encodes the data dependent upon operating conditions and provides the encoded data to the DDS circuitry 706. Such encoding considers current data rate requirements and other operating conditions. The DDS circuitry 706 receives the encoded data and provides an analog output signal to connected radio circuitry 708.

The radio circuitry 708 "up mixes" the analog output signal and transmits the RF modulated signal via antenna 710 to a receiving location. The radio circuitry also receives RF modulated data and down mixes the RF modulated data to produce a modulated intermediate frequency (IF) signal. Such IF signal is provided to the demodulation circuitry 712 which demodulates the IF signal. Such IF signal is provided to the demodulation circuitry 712 which demodulates the IF signal. Upon demodulation, the demodulation circuitry 712 provides the demodulated signal to data conversion circuitry 714 which reproduces a digital signal of interest. Such digital signal of interest is then passed to the data processing circuitry for further use. Such use may be had with attached conventional circuitry 716.

Figure 8:
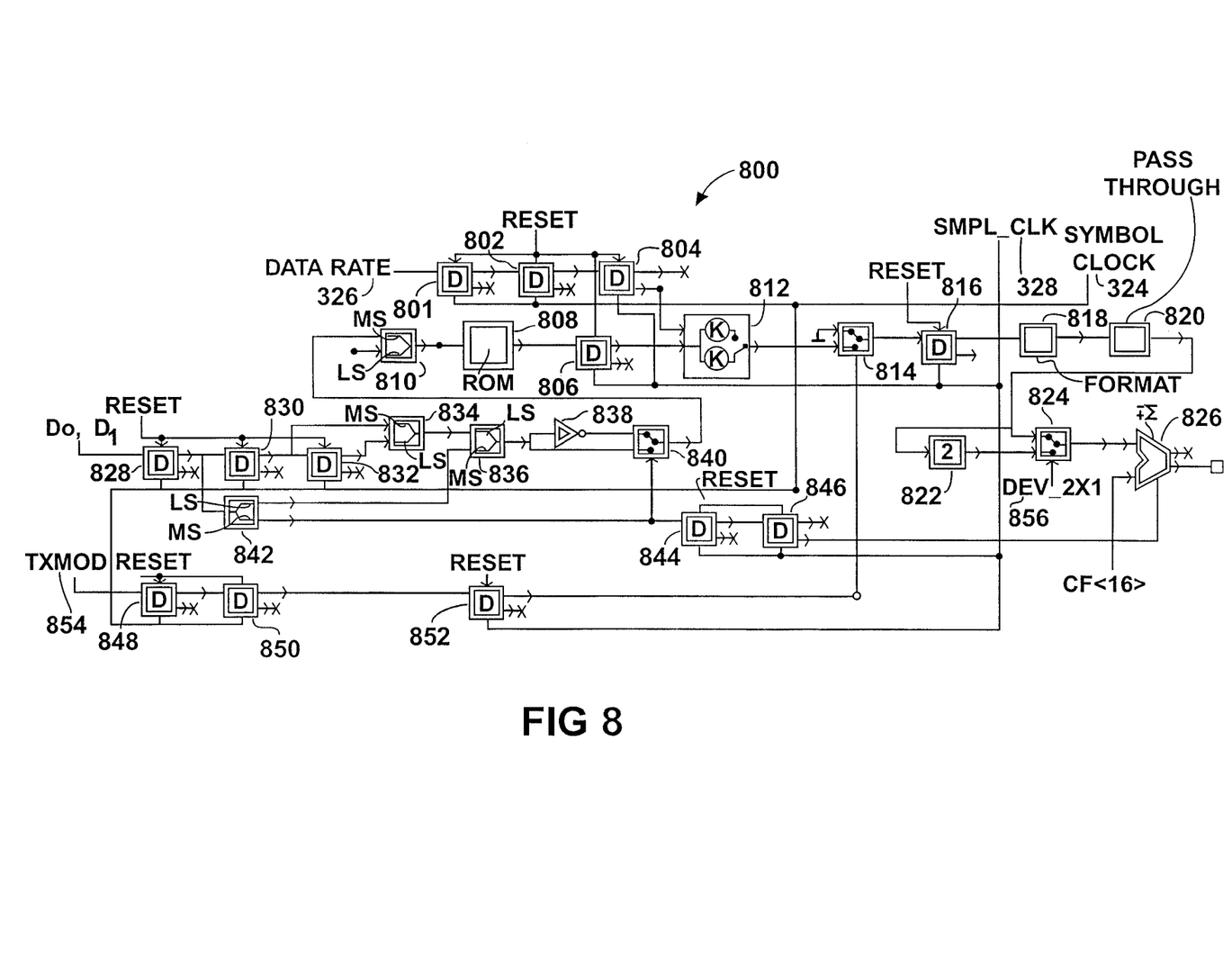
FIG. 8 is a schematic diagram of a GFSK filter constructed in accordance with the present invention.

FIG. 8 illustrates an exemplary GFSK filter 800 constructed in accordance with the present invention. As shown, D flip flops 828, 830 and 832 form a four level shift register such as the four level GFSK shift register 304 described above in conjunction with FIG. 3. Each of the D flip flops 828, 830 and 832 provide dual outputs corresponding to two of the bits of output data $B_5$ through $B_0$. Splitter 842 receives the outputs of the D flip flop 828, providing the least significant bit to a concatenation circuit 836 and the most significant bit to the input of a D flip flop 844. A second concatenation circuit 834 receives the outputs of the D flip flops 830 and 832. The concatenated outputs are provided to the concatenation circuit 836.

The concatenation circuit 836 forms the address used for the 4 level GFSK ROM 808. The five bit address output of the concatenation circuit 836 is inverted by inverter 838 and selector 840 based on the logic level of the most significant bit output of the splitter 842. The five bit address effectively identifies one ten sample portion of the address space of the 4 level GFSK ROM 808. Concatenation circuit 810 combines the five bit address provided by the selector 840 with a sample counter value which repeatedly counts between zero and nine. The sample counter value is synchronized with the symbol clock 324 so that it counts between zero and nine once for each symbol. The output of the concatenation circuit 810 is provided to address input of the 4 level GFSK ROM 808.

D flip flops 801, 802 and 804 form a delay element (such as the delay circuit 309 of FIG. 3) used to provide a delayed version of the data rate indicator 326 to the ROM output scaler 812, with the value of the delay approximating the delay of the four level shift register as well as the delay of a D flip flop 806. The optional D flip flop 806 is coupled between the 4 level GFSK ROM 808 and the ROM output scaler 812 for purposes of introducing a pipelining delay in certain implementations of the GFSK filter 800. Other optional pipelining D flip flops include D flip flops 804, 806, 844 and 852. D flip flops 816 and 846 form a second pipeline stage in the disclosed embodiment of the invention. The pipelining D flip flops are clocked by clocking signal SMPL_CLK 328, which operates at ten times the frequency of the symbol clock 324 of the disclosed embodiment of the invention. The pipelining flip flops are not required for functional operation of the GFSK filter 800, but may be useful to shorten delays through the various stages of the GFSK filter 800.

The output of the 4 level GFSK ROM 808 is provided to the ROM output scaler 812 via the D flip flop 806. The ROM output scaler 812 switches between, for example, two GFSK deviations and four GFSK deviations as described above.

Modulation may be disabled by a switch 814 coupled between the ROM output scaler 812 and the D flip flop 816. Operation of the switch 814 is controlled by an enable signal TXMOD 854, which is latched and delayed (if needed) by the D flip flops 848, 850 and 852. D flip flops 848 and 850 are included in the disclosed embodiment for purposes of matching the delays introduced by D flip flops 828 and 830. In the event modulation is disabled, a constant value of zero is provided at the output of the switch 814.

The ten bit output of the D flip flop 816 is padded to sixteen bits by a formatting circuit 818 and pass through circuit 820. A multiplier circuit 822 receives the scaled output of the pass through circuit 820 and multiplies the output by a factor of two. The output of either pass through circuit 820 or the multiplier circuit 822 is provided to the input of an adder/subtractor 826 via a switch 824. The switch 824 is controlled by a selection signal DEV_2X 856, which is asserted to select the output of the multiplier circuit 822 for certain lower symbol rate applications in which the deviations are doubled.

The adder/subtractor 826 also receives the DDS center frequency input CF<16> and the most significant bit $B_5$ (add/sub) produced by the 4 level GFSK shift register. The most significant bit $B_5$ is provided by an output of the D flip flop 846. Based upon this output, the adder/subtractor 826 either adds the output from the ROM output scaler 812 to the DDS center frequency input CF<16> or subtracts the output from the ROM output scaler 812 from the DDS center frequency input CF<16>. In either case, the adder/subtractor 826 produces a 16 bit output which is provided to a phase accumulator such as phase accumulator 314.

Many variations to the disclosed embodiments of the invention are contemplated. For example, the modulator may comprise a DDS circuit (using FSK, PSK, ASK/AM, QAM, etc.) followed by a DAC. Alternatively, the modulator may comprise a DAC followed by analog circuitry (e.g., a voltage controlled oscillator).

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

The invention claimed is:

1. A multi-rate data modulation circuit comprising:
   a multi-rate data conversion circuit that receives digital data at varying data rates, that receives a data rate input corresponding to the digital data and that converts the digital data to a converted output based upon the data rate input; and
   a modulator circuit that receives the converted output and that synthesizes a modulated output signal based upon the converted output,
   wherein the multi-rate data conversion circuit is capable of transitioning smoothly between data rates at any time, as controlled by the data rate input, said multi-rate conversion circuit comprising a single multi-rate digital data filter that receives converted digital data and produces a filtered digital output, and an output scaler that receives the filtered digital output and produces a scaled and filtered digital output.

2. The multi-rate data modulation circuit of claim 1, wherein the modulator circuit comprises a direct digital synthesis circuit.

3. The multi-rate data modulation circuit of claim 1, the multi-rate data conversion circuit comprising:
   a multi-rate converter that receives the digital data, the data rate input and a clock signal and converts the digital data to converted digital data; and
   an adder that combines the scaled and filtered digital output with a center frequency input and produces the converted output.

4. The multi-rate data modulation circuit of claim 3, the multi-rate digital data filter including a look-up table that produces filter parameters based upon the converted digital data and that operates at multiple data rates.

5. The multi-rate data modulation circuit of claim 3, the multi-rate digital data filter comprising:
   a digital data filter look-up table;
   a data rate decode circuit that receives the data rate input and that produces control signals therefrom;
   a plurality of multiplexors, each of which receives a portion of the converted digital data and control signals from the data rate decode circuit; and
   the multiplexors selectively providing the converted digital data to the digital data filter look-up table to produce the filtered digital output.

6. The multi-rate data modulation circuit of claim 2, the direct digital synthesis circuit comprising:
   a phase accumulator that receives the converted output;
   quadrant logic coupled to the phase accumulator that receives an output of the phase accumulator;
   a direct digital synthesis memory coupled to the quadrant logic that receives an output of the quadrant logic;
   an unsigned converter coupled to the direct digital synthesis memory that receives an output of the direct digital synthesis memory and produces an unsigned output; and
   a digital to analog converter coupled to the unsigned converter that receives the unsigned output and produces the modulated output signal.

7. The multi-rate data modulation circuit of claim 1, wherein the multi-rate data modulation circuit operating to couple a single bit of data to each cycle of the modulated output signal during a first time period and operating to couple two bits of data to each cycle of the modulated output signal during a second time period.

8. The multi-rate data modulation circuit of claim 7, the multi-rate data modulation circuit further operating to couple three bits of data to each cycle of the modulated output signal during a third time period.

9. A wireless network device comprising:
 data processing circuitry that produces digital data at varying data rates;
 a multi-rate data conversion circuit that receives the digital data at the varying data rates from the data processing circuitry, that receives a data rate input corresponding to the digital data and that converts the digital data to a converted output based upon the data rate input;
 a modulator circuit that receives the converted output and that synthesizes a modulated output signal based upon the converted output; and
 a radio that receives the modulated output signal and transmits the modulated output signal;
 wherein the multi-rate data conversion circuit supplies an output dependent upon current data rate requirements, and accommodates a changed data rate in response to a change in the data rate input without requiring the loading of new radio programming prior to receipt of a new data rate.

10. The wireless network device of claim 9, wherein the modulator circuit is a direct digital synthesis circuit.

11. The wireless network device of claim 9, further comprising:
 demodulation circuitry that demodulates the modulated receive signal to produce a demodulated input signal; and
 data conversion circuitry that receives the demodulated input signal, that produces converted digital data and that transmits the converted digital data to the data processing circuitry.

12. The wireless network device of claim 9, the multi-rate data conversion circuit comprising:
 a multi-rate converter that receives the digital data, the data rate input and a clock signal and converts the digital data to converted digital data;
 a multi-rate digital data filter that receives the converted digital data and produces a filtered digital output;
 an output scaler that receives the filtered digital output and produces a scaled and filtered digital output; and
 an adder that combines the scaled and filtered digital output with a center frequency input and produces the converted output.

13. The wireless network device of claim 12, the multi-rate digital data filter including a look-up table that produces filter parameters based upon the converted digital data and that operates at multiple data rates.

14. The wireless network device of claim 12, the multi-rate digital data filter comprising:
 a digital data filter look-up table;
 a data rate decode circuit that receives the data rate input and that produces control signals therefrom;
 a plurality of multiplexors, each of which receives a portion of the converted digital data and control signals from the data rate decode circuit; and
 the multiplexors selectively providing the converted digital data to the digital data filter look-up table to produce the filtered digital output.

15. The wireless network device of claim 10, the direct digital synthesis circuit comprising:
 a phase accumulator that receives the converted output;
 quadrant logic coupled to the phase accumulator that receives an output of the phase accumulator;
 a direct digital synthesis memory coupled to the quadrant logic that receives an output of the quadrant logic;
 an unsigned converter coupled to the direct digital synthesis memory that receives an output of the direct digital synthesis memory and produces an unsigned output; and
 a digital to analog converter coupled to the unsigned converter that receives the unsigned output and produces the modulated output signal.

16. The wireless network device of claim 9, wherein the multi-rate data modulation circuit operating to couple a single bit of data to each cycle of the modulated output signal during a first time period and operating to couple two bits of data to each cycle of the modulated output signal during a second time period.

17. The wireless network device of claim 16, the multi-rate data modulation circuit further operating to couple three bits of data to each cycle of the modulated output signal during a third time period.

18. A multi-rate data modulation circuit comprising:
 first means for receiving digital data at varying data rates, for receiving a data rate input corresponding to the digital data and for converting the digital data to a converted output based upon the data rate input; and
 second means for receiving the converted output and for synthesizing a modulated output signal based upon the converted output,
 said first means for transitioning smoothly between data rates at any time, as controlled by the data rate input.

19. A multi-rate data modulation circuit comprising:
 a multi-rate data conversion circuit that receives digital data at varying data rates, that receives a data rate input corresponding to the digital data and that converts the digital data to a converted output based upon the data rate input; and
 a modulator circuit that receives the converted output and that synthesizes a modulated output signal based upon the converted output,
 wherein the multi-rate data conversion circuit transitions smoothly between data rates at any time, as controlled by the data rate input, and accommodates a changed data rate in response to a change in the data rate input without requiring the loading of new radio programming prior to receipt of a new data rate.

20. The multi-rate data modulation circuit of claim 19, wherein the multi-rate conversion circuit comprises a multi-rate filter that receives multiple samples of input data, and based upon the values of the multiple samples, selects filtering functions to produce filtered data.

* * * * *